Patented Nov. 10, 1931

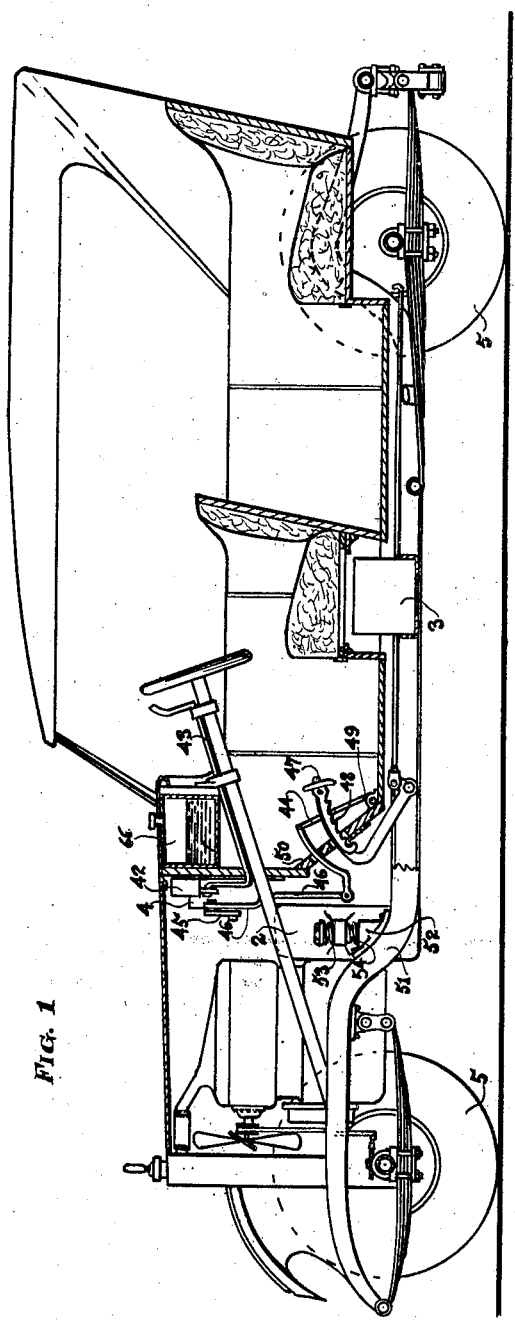

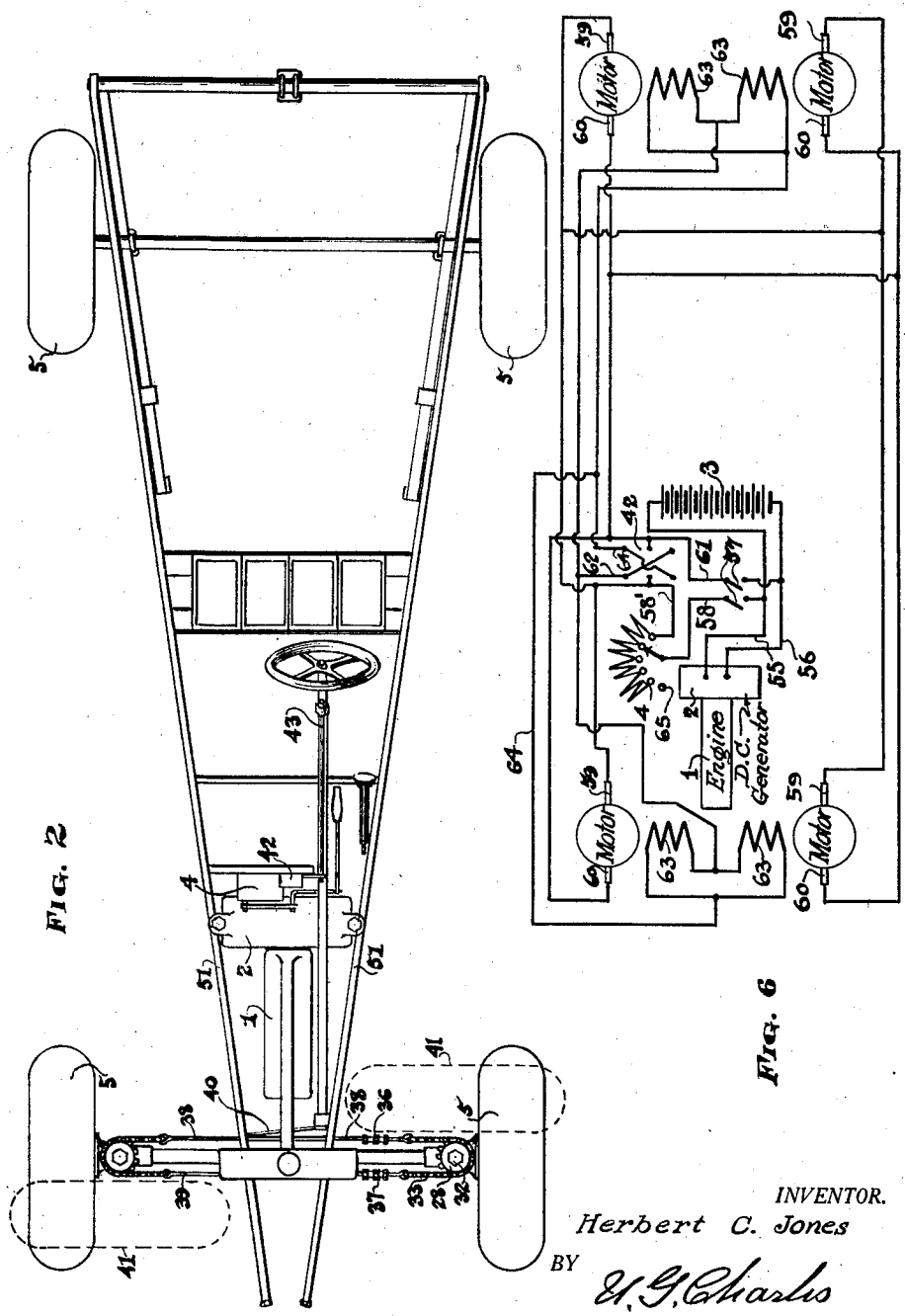

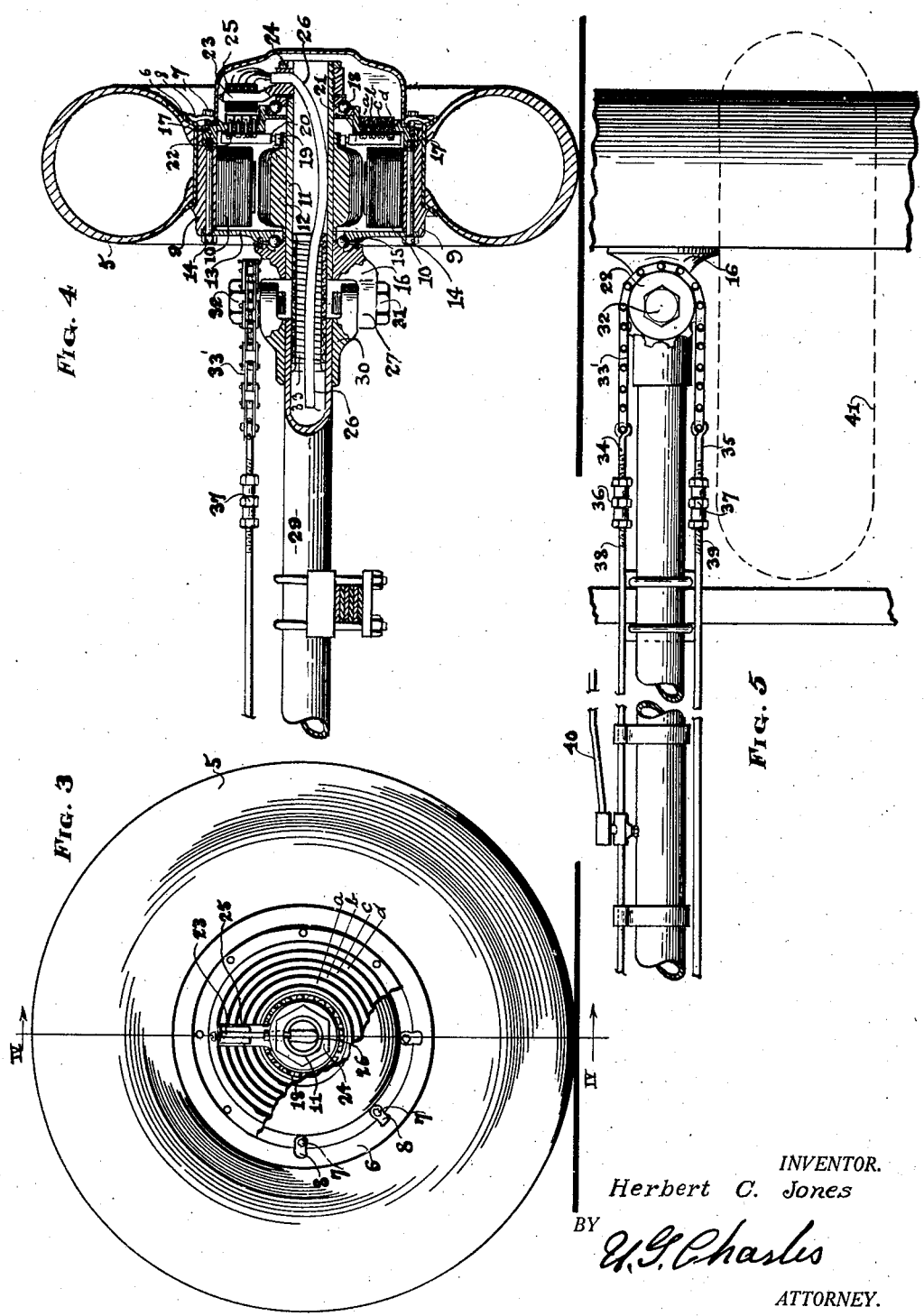

1,831,071

UNITED STATES PATENT OFFICE

HERBERT C. JONES, OF WICHITA, KANSAS

ELECTRIC POWER DRIVEN VEHICLE

Application filed March 30, 1926, Serial No. 98,531. Renewed April 7, 1931.

My invention relates to power driven vehicles, and has for its objects:

First: To produce an automobile having a plurality of traction wheels, and each wheel provided with an electric motor built within the wheel.

Second: To produce an automobile electrically driven, having a storage battery for the purpose of supplying current with which to run the motors.

Third: To produce an automobile having an engine driving a generator, for the purpose of maintaining a charge of electricity in a storage battery, for the purpose of operating electric motors within the wheels of said automobile.

Fourth: To produce an automobile having an engine driven generator, at a constant predetermined speed, for the purpose of recharging the storage battery.

Fifth: To produce an automobile having a light weight low horse power engine, yet having a high momentary traction horse power.

Sixth: To produce an automobile, the drive motors of which are adapted to automatically generate a current when the car is coasting down hill or otherwise, and the said current will flow to the battery where it is stored for future use.

Seventh: To produce an automobile having a high acceleration capacity.

Eighth: To produce an automobile having an extremely low center of gravity.

Ninth: To produce an automobile whose construction will permit the front wheels to be turned transversely to the longitudinal center line of the automobile, and being able to drive said wheels in said position.

Tenth: To produce an automobile whose motors act as a braking factor when desired.

Referring to the drawings:

Fig. 1 is a longitudinal sectional view of the automobile.

Fig. 2 is a plan view of the chassis.

Fig 3 is a side view of one of the wheels, with a portion of the cap broken away for the convenience of illustration.

Fig. 4 is a sectional view, taken along the line IV—IV in Fig. 3.

Fig. 5 is a plan view of Fig. 4.

Fig. 6 is a wiring diagram.

In Fig. 1, 1 is an ordinary light weight gasoline engine, driving a generator 2 which generates electric current, which is stored in the storage battery 3; 4 is a rheostat adapted to increase or decrease the amount of current furnished to the motor.

Figures 3 and 4 are views showing the motor in which 5 is the tire mounted on a demountable rim 6, held in place by bolts 7 and lugs 8; 9 is a frame on which the field magnets 10 are mounted. A hollow axle 11 has an armature 12 mounted thereon. A frame member 13 is secured to the frame 9 by means of bolts 14 and the said frame 13 is provided with a ball race 15. The axle 11 is provided with a casting 16, which is provided with a ball race, and these two races and the ball which is shown in them form the bearing on the inside of the wheel. A plate 17, which is similar to plate 13 is held in position by bolt 14, and this plate is provided with a ball race to take the balls 18. On the plate 17 is four metallic rings A, B, C, and D. These rings are insulated from each other and are also insulated from the plate 17. The commutator 19 of the motor and the brushes 20 are held in metal tubes 21. The tubes 21 are connected to the proper rings A, B, C or D, by means of screws 22. A bracket 23 is rigidly mounted on the axle 11, and held in place by a nut 24. This nut also acts as a lock nut to bearing 18. In this bracket 23 is mounted an insulated block 25, carrying brushes, one for each of the said rings A, B, C, and D. A cable 26 carries four wires, one going to each brush.

This motor is an ordinary standard motor with the exception that the field revolves instead of the armature. Therefore it is necessary to employ the rings A, B, C and D and the brushes in the member 25, merely as a means of transmitting current to moving parts which are ordinarily stationary.

The outer end of the casting 16 forms a portion of the steering knuckle 27. The upper half of this steering knuckle is provided with a sprocket 28. An axle 29 is provided with a casting 30 adapted to receive the casting 27, and the castings 30 and 27 are pivotally held together by means of bolts 31 and 32. This forms the steering knuckle for the front wheels. A flexible tubing 33 joins the axle 11 and 29 together so that the cable 26 may pass through the steering knuckle in a flexible weather proof housing.

On the rear wheels which do not have steering knuckles, the axle 29 extends into the motor and takes the place of the axle 11. A chain 33' is mounted on the sprocket 28, the ends of which connect the rods 34 and 35, which are threaded into turnbuckles 36 and 37. Rods 38 and 39 are also threaded into the turnbuckles 36 and 37. The rods 38 and 39 extend to the opposite side of the car, where they connect to a chain which is a duplicate of 33', and the steering mechanism is also duplicated. A steering rod 40 actuates the movement of the steering mechanism reciprocating the front wheels, guiding the desired direction of the automobile.

This construction permits the front wheels to be turned directly cross ways of the car, as shown by the dotted lines 41. This makes it possible to turn a car in an extremely short space, and is also a big advantage in parallel parking. A reverse switch 42 is operated by a crank lever 43. An accelerator pedal 44 is connected to the rheostat arm 45 by a connecting rod 46; 47 is a brake pedal having ratchets 48 which are adapted to catch on a metal stop 49 on the floor board 50.

The engine is mounted in the frame 51 on bearings as shown at 52, having springs 53 and 54 on each side of the engine support which forms a flexible mounting, so that vibration from the engine is not transmitted to the frame of the car. The engine used in this automobile is an ordinary internal combustion motor having the usual self starter, and means of operating it, but these are not shown, as they are not vital points of interest.

The wiring diagram shown in Fig. 6 shows the simple wiring system, omitting such things as meters, fuses, locking switches etc.; 1 is the engine driving the generator 2, delivering the current through the wires 55 and 56 to the battery 3 where it is stored; 57 is a switch between the source of supply and the motors. The wire 58 runs to the rheostat arm where the current flows through the rheostat 4, and comes from the rheostat on the wire 58' as a regulated current which controls the speed of the motor. The wire 58' through its branches runs to the commutator 59 of each of the four motors, out the other side of the commutator 60 of each of the four motors, and returns on the wire 61 which completes the circuit through the armature. The wires 58 and 61 connect to the reverse switch 42, and the wire 62 through its branches delivers the current to the field coils 63 through each of the four motors, and the current after flowing through each of these coils returns on the wire 64 which completes the circuit through the field coils. The current supplied to these motors through the battery is a D. C. (direct current), therefore it always flows in one direction.

In order to reverse the motors, the direction of the flow of the current must be reversed, either in the field coils or the armature of the motor. According to the diagram in Fig. 6 the current is reversed in the field coils, which means that the motors running in one direction have a current passing from wire 58' through the reverse switch into wire 62, then through the field coil and after passing through the field coil, the current returns on wire 64, and connects to wire 61, which completes the circuit through the field coil in one direction. To reverse the motors the reverse switch 42 is thrown on the opposite side, and wire 58 is connected to wire 64, and the current flows to the field coil 63, and then out of the coil 63, back on the wires 62 and connects to wire 61, which completes the circuit through the field coil, but the current is flowing in the opposite direction, reversing the motor. The rheostat 4 is provided with one dead point 65, and the rheostat arm, through a spring control which is not shown stands on this point, unless it is held on some other point as will be later explained.

The automobile is operated as follows:

The driver throws the lever 43 to one side or the other, which determines whether the motors run forward or backward. After this is done, the accelerator pedal 44 is pushed down, thereby swinging the contact arm in the rheostat, and the further down the pedal is pushed the more the resistance is decreased in the rheostat, and the faster the motors run, and to stop, the accelerator pedal is released, and the contact arm on the rheostat returns to the dead point 65, where the current is completely cut off from the motors, and the car will coast. When the car is coasting it may be stopped in two ways. The first way is to push in the brake pedal 47, which operates brake bands on brake drums on the rear wheels, such as are commonly used in automobile construction. The other way is to throw the reverse switch on the motors and apply the current to whatever degree is necessary to bring the automobile to a stop. When the car is parked, the brake pedal 47 may be pushed down, and the ratchet 48 allowed to hold the pedal in its down position, thereby acting as an emergency brake. This ratchet and foot piece is pivotally mounted on the brake arm, and is operated by rocking the foot pedal so as to cause the ratchet to catch or release as desired.

Attention is called to the fact that the wheels of this car are very small, only using tires 28 inches in diameter, which allows the motors to run with great speed, which is a desirable feature when taking the efficiency of the motor into consideration. Also note the middle part of the frame of the car is dropped so that the car sets low to the ground, thereby making a low center of gravity, and producing a car whose appearance is long lines and low to the ground. This car carries as much seating capacity as the usual car, and as it is shown in the drawings, the highest point is five feet and two inches from the ground. Note also the long spring base and platform spring, which makes an easy riding car. The gasoline tank is located under the cowl as shown at 66 which provides a gravity flow of the gasoline to the motor, and does away with the usual vacuum tank feed.

It is a characteristic of electric motors of this type when being driven as they would be in the case of the car coasting, that they will produce a current of electricity the same as a generator, and this current returns to the storage battery. Taking this feature into consideration the car is practical in a hilly country. While the motors in these wheels may only develop from three to five horse power each, which amount of current is not consumed by ordinary speed on a pavement, therefore the battery is not pulling the maximum load on ordinary running and it is storing current all of the time. But should the momentary load come on, such as pulling sand or a hill, the combined power of the battery and generator is fed to the motors, and the momentary power demanded for this load is supplied in this way.

Such modifications may be employed as lie within the scope of the appended claim.

Having thus described my invention, what I claim as new and desire to secure by Letters Patent is:—

In a front wheel assembly for motor vehicles of the kind described, a hollow axle having a bifurcated bearing, a second bifurcated bearing in pivotal engagement with the first said bifurcated bearing and rigidily connected to a second axle, a wheel carrying a pneumatic tire trunnioned on the second axle and having the frame of an electric motor as its spider, the field of the electric motor positioned on the frame and the armature positioned on the second hollow axle, a sprocket member rigidly connected to the second bifurcated bearing and a chain engagement therewith as turning means, means to furnish electrical energy to the motor and a flexible conduit positioned between the two bifurcated bearings.

HERBERT C. JONES.